United States Patent
Gasgnier

(10) Patent No.: US 10,286,629 B2
(45) Date of Patent: May 14, 2019

(54) METHOD OF FORMATION FOR COMPOSITE MATERIALS COMPRISING CEMENT AND GEOPOLYMER CONTAINING LAYERS, AND PRODUCTS OBTAINED FROM SUCH METHODS

(71) Applicant: Imerys Ceramics France, Paris (FR)

(72) Inventor: Gilles Gasgnier, Limoges (FR)

(73) Assignee: ImerTech SAS, Paris (FR)

( * ) Notice: Subject to any disclaimer, the term of this patent is extended or adjusted under 35 U.S.C. 154(b) by 242 days.

(21) Appl. No.: 15/036,367

(22) PCT Filed: Nov. 14, 2014

(86) PCT No.: PCT/EP2014/074670
§ 371 (c)(1),
(2) Date: May 12, 2016

(87) PCT Pub. No.: WO2015/071435
PCT Pub. Date: May 21, 2015

(65) Prior Publication Data
US 2016/0263861 A1    Sep. 15, 2016

(30) Foreign Application Priority Data

Nov. 14, 2013   (EP) .................................... 13290284

(51) Int. Cl.
| | | |
|---|---|---|
| *B32B 13/04* | (2006.01) | |
| *C04B 28/00* | (2006.01) | |
| *C04B 28/04* | (2006.01) | |
| *E04C 2/04* | (2006.01) | |
| *C04B 111/00* | (2006.01) | |
| *C04B 111/54* | (2006.01) | |
| *C04B 111/80* | (2006.01) | |
| *C04B 111/82* | (2006.01) | |
| *E04C 2/00* | (2006.01) | |

(52) U.S. Cl.
CPC ............ *B32B 13/04* (2013.01); *C04B 28/008* (2013.01); *C04B 28/04* (2013.01); *E04C 2/044* (2013.01); *B32B 2250/02* (2013.01); *B32B 2419/00* (2013.01); *C04B 2111/00146* (2013.01); *C04B 2111/00612* (2013.01); *C04B 2111/54* (2013.01); *C04B 2111/80* (2013.01); *C04B 2111/82* (2013.01); *E04C 2002/005* (2013.01); *Y02P 40/165* (2015.11)

(58) Field of Classification Search
None
See application file for complete search history.

(56) References Cited

U.S. PATENT DOCUMENTS

| | | | | |
|---|---|---|---|---|
| 3,529,999 A | * | 9/1970 | Boeniger | ............ C04B 41/5315 134/2 |
| 2012/0031303 A1 | * | 2/2012 | Constantz | ............... C04B 14/26 106/640 |
| 2012/0260594 A1 | * | 10/2012 | Blackstock | ........... C04B 28/006 52/302.1 |
| 2014/0318069 A1 | * | 10/2014 | Moennig | ................. E04B 1/762 52/511 |

FOREIGN PATENT DOCUMENTS

| | | |
|---|---|---|
| DE | 41 07 430 A1 | 9/1992 |
| DE | 195 35 390 A1 | 5/1996 |
| EP | 0 921 106 A1 | 6/1999 |
| FR | 2 680 194 A1 | 2/1993 |
| FR | 2 831 905 A1 | 5/2003 |

OTHER PUBLICATIONS

International Search Report and Written Opinion dated Jun. 11, 2015, in International Application No. PCT/EP2014/074670 (12 pgs.).

\* cited by examiner

*Primary Examiner* — Robert T Butcher
(74) *Attorney, Agent, or Firm* — Finnegan, Henderson, Farabow, Garrett & Dunner, LLP

(57) ABSTRACT

The present invention relates to methods for forming a layered composite material, the finished product comprising at least one geopolymeric layer and at least one cement-based layer. The method of the invention allows the provision of products with more varied appearances, shapes, colours, gloss, or surface structures such as decorations, reliefs, roughness, or the like. Products obtained according to the method of the invention also form part of the invention.

18 Claims, 2 Drawing Sheets

METHOD OF FORMATION FOR COMPOSITE MATERIALS COMPRISING CEMENT AND GEOPOLYMER CONTAINING LAYERS, AND PRODUCTS OBTAINED FROM SUCH METHODS

CLAIM FOR PRIORITY

This application is a U.S. national phase entry under 35 U.S.C. § 371 from PCT International Application No. PCT/EP20141074670, filed Nov. 14, 2014, which claims the benefit of priority of EP Application No. 13290284.2, filed Nov. 14, 2013, the subject matter of which is incorporated herein by reference.

FIELD OF THE INVENTION

The present invention relates to methods for preparing layered composite materials. In particular, the present invention relates to methods for preparing composite materials comprising a geopolymer containing layer and a calcium silicate-based cement containing layer, for use as, for example, building panels, flooring panels, prefabricated walls, and the like.

BACKGROUND OF THE INVENTION

The use of concrete and other cement containing materials in construction has obvious long-standing advantages. However, their appearance, particularly when used to provide inner or outer walls, floorings and other overtly visible portions of buildings or other structures, has for a long time been considered problematic. While it is common that concrete surfaces dominate the aspect of buildings, their appearance is by many considered to be of low aesthetic value, and does not allow for variety or flexibility in the design of surfaces.

Concrete surfaces can be hidden by the use of claddings, floorings, double ceilings, and the like. All these solutions however serve to hide concrete structural portions from direct view, rather than improve the appearance. Furthermore, concrete surfaces generally have a rough and/or irregular surface structure, such that it is difficult or even impossible to provide concrete surfaces with a defined surface structure, such as with specific shapes, colours or gloss, or with surface structures such as decorations, reliefs, roughness, or the like. It is an objective of the present invention to provide methods for providing cement containing materials for use as structural and load-bearing portions in construction, wherein surface properties may be adapted according to requirements, regarding their shape, roughness, colour, appearance, aspect or the like.

The use of geopolymers as structural building units is known to the skilled person. US 2012/0260594 A1 discloses "geopolymeric cements" formed from precursors having a relatively high alumina content for use as structural building units for improvement of thermal performance.

US 2012/0159877 A1 discloses building panels comprising a geopolymer portion, wherein a core includes a first geopolymer concrete, and one or more protective layers including a second geopolymer concrete are located adjacent to the core.

However, geopolymers have a high alkalinity, which limits their use as structural building units, in particular when large amounts are required. The handling of large amounts of alkaline products presents obvious difficulties.

SHORT DESCRIPTION OF THE INVENTION

The present invention is defined in the appended claims.

In particular, the present invention is embodied by a method for forming a layered composite material, comprising the steps of (a) casting a first castable composition into a mould to obtain a first cast composition, (b) applying a binder composition to at least one external surface of the said first cast composition obtained at the end of the previous casting step, and, at the end of the applying step, (c) casting a second castable composition onto the said at least one external surface of the obtained first cast composition in the said mould. The method is further characterised in that the first castable composition is selected from a geopolymer containing or geopolymer forming composition and a calcium silicate-based cement containing composition, and in that the second castable composition is the other one out of a geopolymer containing or geopolymer forming composition and a calcium silicate-based cement containing composition.

According to one embodiment of the invention, the calcium silicate-based cement containing composition is a concrete composition comprising a calcium silicate-based cement, such as for example a Portland cement.

According to a further embodiment of the invention, the binder composition used is selected from an inorganic gravel, such as a metal oxide gravel, and metallic inserts, such as I-shaped metallic inserts, U-shaped metallic inserts, metallic wires, or metallic wire mesh, or polymeric inserts, such as I-shaped polymeric inserts, or U-shaped polymeric inserts, or mixtures of any of the previous.

According to a further embodiment, the binder composition may be an inorganic composition particulate composition which has been pre-treated by washing in basic aqueous solution and subsequent neutralising washing with water. The binder composition may be a quartz, such as for example a silica gravel. In some embodiments, the binder may be selected from basalt, granite, silicate or alumina-silicate minerals, such as for example feldspars, andalusite, feldspatic sands or other materials known to the skilled person in the art. The binder composition may also be a mixture of any of two or more of the mentioned binders. In one embodiment of the invention, the binder composition is a quartz gravel. The binder composition may be a particulate composition having an average particle diameter in the range of up to 30 mm, such as for example between 2 mm and 25 mm, such as for example 4 mm, or from 5 mm to 20 mm, or from 10 mm to 15 mm, such as for example about 10 mm or about 15 mm.

According to one embodiment of the invention, the mould used may be a plastic mould, such as for example a polycarbonate mould. Any polymeric moulds may be used, provided that geopolymers and calcium silicate-based cements as used in the present invention do not adhere thereto.

According to one embodiment of the invention, the first castable composition may be vibrated after casting into the mould, such that it becomes uniformally dispersed within the mould and any air bubbles are essentially removed therefrom prior to the initiation of the applying step.

According to one embodiment of the invention, the first castable composition is at least partially set prior to the applying step, such that the binder composition remains on top of the external surface of the first castable composition, or such that the binder composition remains in contact with the external surface of the first castable composition, prior to the initiation of the step of casting the second castable composition.

According to further embodiments of the invention, the mould used may have any shape such as to obtain a cast product in the desired shape. For example, in order to form cuboid-shaped building panels, correspondingly shaped moulds may be used. Other applications are pavement slabs, or external panels for prefabricated buildings.

According to the present invention, the method may be used for forming multi-layered composite materials, by addition of a further step of applying a binder composition to at least one external surface of the said second cast composition obtained, followed by a repeat of the step of casting a first castable composition into the mould. Accordingly, this may be repeated until the desired number of layers is obtained. For example, a tri-layered composite material may be obtained comprising a calcium silicate-based cement layer sandwiched in between two geopolymeric layers.

According to one embodiment of the present invention, the method may comprise a further step of demoulding the layered composition material after casting and setting of the first and second castable compositions.

Also part of the present invention are the products obtained from the method according to the invention. Also part of the invention is a layered composite composition comprising a geopolymeric layer and a calcium silicate-based cement containing layer, wherein the interface of said layers is lined with a binder composition as described herein, for use as a load-bearing structural unit in construction, as a pavement slab or as an external panel for a prefabricated building

SHORT DESCRIPTION OF THE FIGURES

The invention will be further illustrated by reference to the following figures.

Figure 1:
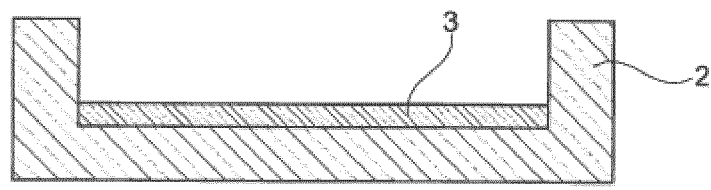
FIG. 1 represents a schematic diagram of a mould used in the method according to the present invention after a step of casting a first castable material.

It is understood that the following description and references to the figures concern exemplary embodiments of the present invention and shall not be limiting the scope of the claims.

DETAILED DESCRIPTION OF THE INVENTION

As used herein, the term "geopolymer forming composition" designates a composition which upon setting forms a geopolymer.

As used herein, the term "geopolymer" is to be understood as an inorganic polymeric composition formed from compositions which are modified from those as described under the heading "The Geopolymerization Process" in US 2012/0260594 A1, comprising an aluminosilicate source, and alkali hydroxide/silicate solution. However, as used herein, the term "geopolymers" designates polymeric compositions essentially free of calcium, as no calcium source is required for accelerating the setting of the composition.

Accordingly, it is understood that as used herein the terms "geopolymer" and "calcium silicate-based cement" are mutually exclusive. The first and second castable compositions may respectively consist of a geopolymer or geopolymer forming composition and a calcium silicate-based cement.

The present invention according to the appended claims provides a method for forming layered composite materials. The layered composite materials produced by the method according to the present invention may be in the shape of slabs comprising a geopolymeric layer and a calcium silicate-based cement-containing layer, such as a concrete layer. According to the present invention, the layers of the composite slabs obtained by the inventive method are held together by a binder composition, which may be an inorganic material, and which is introduced into the structure after casting of the first of the layers making up the composite structure in such a way that the binder composition remains on the surface, or within the surface of the first castable composition at the time when the second castable composition is cast.

According to the present invention, first and second castable compositions are moulded in a mould, in order to obtain a layered composite material. The first and second castable compositions are one each of a geopolymer containing or geopolymer forming composition and a calcium silicate-based cement containing composition, such that the finished product comprises layers of both a geopolymeric composition and a calcium silicate-based cement containing composition. In one embodiment of the present invention, the obtained product is a slab containing one layer of a geopolymeric composition and one layer of a calcium silicate-based cement containing composition. Products having more than two layers are conceivable, in which one calcium silicate-based cement containing layer is sandwiched in between geopolymeric layers, or vice-versa. Furthermore, products having four or more layers can be obtained according to the method of the present invention. At the end of the final casting step, and after all the layers have set, the structure is demoulded in order to obtain the desired composite.

According to the method of the present invention, the mould used shall preferably be suitable for obtaining a finished product with a good surface quality, such that the surface of the product mimics the surface features of the mould (for example smoothness) as perfectly as practically feasible. The castable compositions as used according to the present invention should not adhere to the mould material. In one embodiment, the mould used is plastic mould, such as a polycarbonate mould. Suitable mould materials are known to the skilled person.

According to the present invention, the geopolymeric composition obtained as part of the composite material is able to perfectly reproduce any details of the surface of the mould. This mimetic effect is not encountered in cement based products. Accordingly, the mould may be specially designed and textured to give specific shape to the final product, including detailed surface structures which cannot be obtained with cement or concrete surfaces. For example, according to the invention complex surface decorations or structures (such as drawings of wood veins) may be reproduced on the surface of the mould, and the final geopolymeric surface will also show these complex surface decorations or structures. In further embodiments, the surface structure may be such that glossy surfaces are obtained thanks to the mimetic effect achieved by geopolymers, or the castable geopolymer containing or forming composition may comprise one or several dies for obtaining a surface coloured in one or several colours. During the step of casting the castable geopolymer containing or forming composition, the said composition may be obtained from composition portions with dies of different colours, in order to provide a surface coloured in several colours, provided the various composition portions are not homogeneously mixed upon setting of the said composition.

According to the present invention, the mentioned surface structures to be obtained in the final product may be achieved by the use of a corresponding structure at the base of the employed mould, if the first castable composition is the geopolymer forming castable composition. In this case, when the first castable material is cast into the base of the mould, the mould structure will appear on the geopolymeric surface at the end of the process according to the invention, after demoulding.

According to the present invention, if the second castable composition is the geopolymer forming castable composition, the desired shape and/or structures is obtained by placing a slab replicating the said structures on top of the setting geopolymer forming castable composition after the step of casting the second castable composition. The said slab may be made of the same material as the mould, or any other material, provided that it does not adhere to the said geopolymer containing or forming composition.

A castable composition which is a geopolymer containing or geopolymer forming composition can be a pure geopolymeric composition. Geopolymeric compositions suitable for use in the present invention are as defined in US 2012/0260594 A1, but are free of calcium, as discussed above. The geopolymer containing or geopolymer forming composition may further comprise constituents which render it aesthetically appealing, according to the desired use, such as for example pigments, dies, mica or the like. FIG. 1 represents schematically a mould with a first castable composition (here labelled as a geopolymer containing or geopolymer forming composition) after the end of the casting step (a).

A castable composition which is a calcium silicate-based cement containing composition can be a concrete composition, such as a calcium silicate-based cement containing concrete composition, such as a hydraulic cement containing composition, like for example a Portland cement containing concrete composition, or a non-hydraulic cement containing composition. Other castable calcium silicate-based cement containing compositions are conceivable, such as castable Portland cement, castable Portland mortars and the like.

Figure 2:
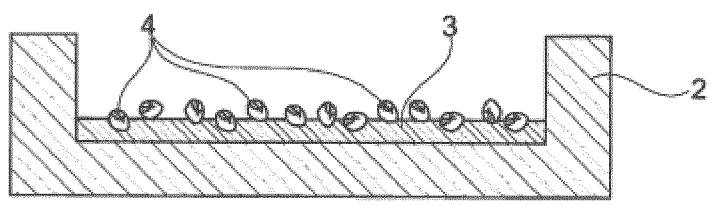
FIG. 2 represents a schematic diagram of a mould used in the method according to the present invention after a step of applying a binder composition.

The binder composition for use in the present invention may be an inorganic binder composition which is provided to a surface of the first castable composition after casting, which surface is intended to come in contact with the second castable composition to form the finished layered composite product. In one embodiment, the binder composition is a particulate composition and is provided to the said surface in such a way that it remains on the surface of the of the first castable composition, or that it becomes only partially submerged within the first castable composition, such that the binder composition particles each remain entirely or partially above the surface of the first castable composition. In order to achieve this, it may be necessary to allow the first castable composition to set or partially set before the binder composition is provided to the said surface of the first castable composition. FIG. 2 illustrates a first castable composition and a binder material at the end of step (b) according to the method of the invention, wherein some of the binder material particles are partially submerged within the first castable composition.

According to the present invention, the binder material may be an inorganic particulate material, such as for example a particulate metal oxide, or a metallic material, such as metallic particles (I-shaped metallic inserts, U-shaped metallic inserts, metallic wires, metallic wire mesh, or similar), or plastic particlaes (I-shaped polymeric inserts, or U-shaped polymeric inserts), or mixtures of any of these. Particulate metal oxides may be selected from silica, alumina, and more generally minerals such as basalt, graphite, or silicate or alumina-silicate minerals, such as feldspars, feldspatic sands, andalusite and the like, or other suitable materials known to the skilled person. The particulate binder material may have an average particle size up to 30 mm, such as for example between 2 mm and 25 mm, such as for example 4 mm, or from 5 mm to 20 mm, or from 10 mm to 15 mm, such as for example about 10 mm or about 15 mm.

In case of the use of I-shaped particles or U-shaped particles (whether metallic or polymeric), or wires or wire mesh, these may be employed such that they are immersed in both the first castable composition and the second castable composition, such that they create at least a mechanical anchoring between the phases, holding them together.

In the finished product, the binder material may provide mechanical binding through the partial submergence in both layers across the layer interface on the one hand, and chemical binding by interacting with both the geopolymer compositions and the calcium silicate-based cement on the other hand. It is thought that the binder surface may react with the alkaline geopolymer forming castable mixture to form a chemical bond between them.

According to one embodiment of the present invention, the said binder material may be an inorganic particulate binder material, which has been pre-treated by an aqueous alkaline washing step, optionally followed by an aqueous neutralising step. The said pre-treatment may be carried out by washing of the said particulate inorganic composition in a dilute aqueous NaOH-solution for 24 h, and optionally subsequent washing with neutral water. For example, a particulatre feldspar composition may be treated in such a way, or a particulate quartz composition.

It was found that the use of pre-treated inorganic particulate binders lead to improved tensile strengths in the finished layered composite materials, compared to when untreated inorganic particulate binders were used. Furthermore, it was found that the aqueous alkaline pre-treatment of the inorganic particulate binders lead to an improved affinity fort the geopolymeric phase in the finished composite layered products.

After casting of the first castable material, the cast material may be vibrated in order to ensure uniform dispersion of the material within the mould and to evacuate any gas bubbles that may have been entrapped within the first castable material. The first castable material may not be vibrated after provision of the binder material, in order to prevent the binder material from sinking in the first castable material and no longer be in contact with the exterior surface of the first castable material, such that the binder material would be unable to interact within the interface between the layers of the finished composite material.

Figure 3:
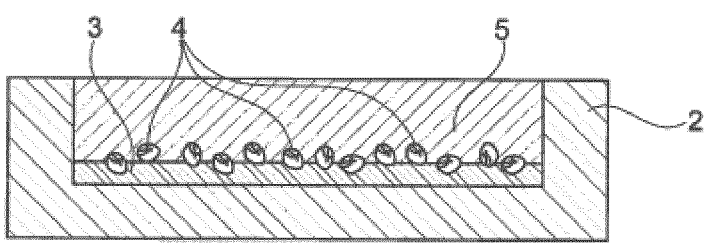
FIG. 3 represents a schematic diagram of a mould used in the method according to the present invention after a step of casting a second castable material.

After casting of the second material, the same applies, and the cast material may be vibrated in order to ensure uniform dispersion of the material within the mould and to evacuate any gas bubbles that may have been entrapped within the second castable material. FIG. 3 represents schematically a mould after the end of the casting step (c), comprising the first and second castable compositions and the binder composition.

According to the present invention, it is possible to provide structural and/or load bearing elements, for example for use in construction, wherein the said elements may have imparted on them surface properties, such as structure, relief, roughness, colour, pattern, gloss etc.

EXAMPLES

Example 1

The method according to the present invention was tested in the way as illustrated in the appended Figures. According to the Example presented, a geopolymeric composition comprising water, sodium silicate, sodium hydroxide and metakaolin Argical M1000 provided by AGS (Imerys) with a molar ratio Al:Si:Na:H$_2$O of 1:1.5:1:14 was cast into a polycarbonate mould (15×15 cm), vibrated until uniformally dispersed within the polycarbonate mould (substantially without any gas pockets present in the mould) and allowed to set at room temperature (FIG. 1). The geopolymeric composition was a mixture of two composition portions comprising red and straw-coloured dies respectively, and which were poured into the mould simultaneously during the casting.

Next, a quartz gravel (provided by Quartz de Dordogne (Imerys)) having an average particle diameter of about 4 mm was dispersed on the exposed surface of the (partially set) geopolymeric composition as a binder composition such that there were about 2 to 3 grains per cm$^2$ exposed surface. As the geopolymeric composition continued to set, the binder composition was bound to the geopolymeric composition (FIG. 2). After full setting of the geopolymer (about 24 hours later), a Portland cement based concrete (standard commercial ready-to-use concrete by VPI) was prepared and cast on top of the exposed geopolymeric surface with the bound binder composition (see FIG. 3). The cast composition was vibrated, compacted and then allowed to set for another 24 hours and the obtained composite product was then stripped from the mould.

Figure 4:
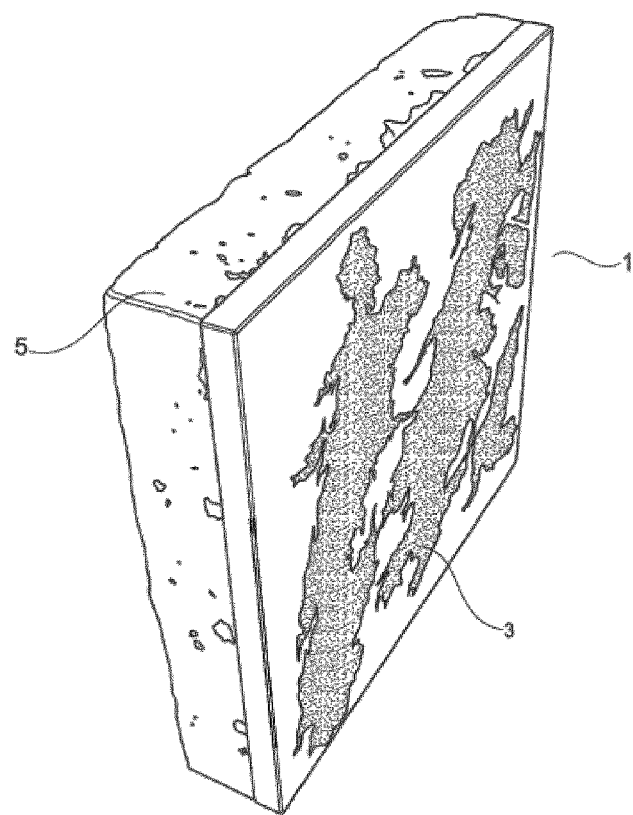
FIG. 4 is a representation of a finished layered composite material after demoulding.

The obtained composite layered slab is represented in FIG. 4. The geopolymeric surface obtained was glossy and, according to the colouring employed in the geopolymeric composition, had red and straw colours with a pattern resulting from the mixing during the pouring step of the first castable composition.

It was shown that a composite slab suitable for use in construction (as wall, flooring, ceiling or other structural element) can be produced having a geopolymeric surface, which makes the use of the concrete element in construction more versatile since no further treatment, hiding by cladding or the like is required in order to avoid a concrete-like appearance.

Example 2

The above was repeated using various types of inorganic particulate binders, wherein the binders A, B and C were used in untreated condition, treated condition and treated and washed condition. The treatment consisted in a 24 hour washing in dilute aqueous NaOH-solution. The washing step involved a neutralising washing in water.

Figure 5:
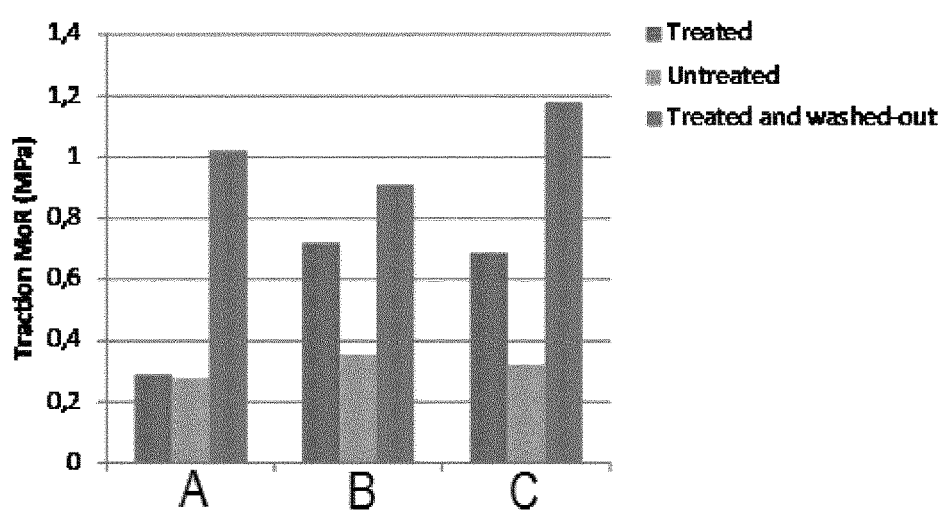
FIG. 5 is an illustration of the results of binding strength tests obtained by using various inorganic particulate binders with different types of pre-treatment.

Binder A is a feldspatic ore with a broad particle size distribution. Binder B is a quartz with an average particle diameter of about 4 mm. Binder C is a quartz with an average particle diameter of about 6 mm. After formation of a composite layered slab as described in Example 1, the tensile strength required for separating the layers was measured and the examples are represented in FIG. 5. It was found that the aqueous alkaline treatment notably improved the binding performance for the quartz binders, and that the alkaline aqueous treatment followed by neutralising washing provided even improved results for the quartz binders, and strong improvement for the feldspatic ore binder.

The invention claimed is:

1. A method for forming a layered composite material, comprising the steps of
    (a) casting a first castable composition into a mould to obtain a first cast composition;
    (b) applying a binder to at least one external surface of the said first cast composition obtained at the end of step (a); and
    (c) at the end of step (b), casting a second castable composition onto the said at least one external surface of the obtained first cast composition in the said mould, wherein the said first castable composition is one selected from a group consisting of (i) a geopolymer containing or geopolymer forming composition and a calcium silicate-based cement containing composition; the said second castable composition is the other one of either (i) or (ii) selected from the same group consisting of (i) a geopolymer containing or geopolymer forming composition and (ii) a calcium silicate-based cement containing composition; and said binder is applied to form a layer at the interface between said first castable composition and said second castable composition.

2. The method of claim 1, wherein the said binder is an inorganic particulate composition comprising quartz, a silicate or an alumina-silicate mineral, metallic inserts, polymeric inserts or mixtures of any of the previous.

3. The method of claim 2, wherein the said binder is an inorganic particulate composition which has been pretreated by washing in basic aqueous solution and reducing the pH by washing with water.

4. The method of claim 3, wherein the said binder is a quartz gravel.

5. The method of claim 2, wherein the said inorganic particulate composition has an average particle size between 1 and 30 mm.

6. The method of claim 1, wherein the said mould is a plastic mould.

7. The method of claim 1, wherein the said first castable composition is vibrated after casting into the mould such that the said first cast composition is uniformly dispersed within the said mould and any air bubbles are essentially removed therefrom prior to the initiation of step (b).

8. The method of claim 1, wherein the said first castable composition is at least partially set prior to step (b), such that the said binder remains on or within the said external surface of the first castable composition prior to the initiation of step (c).

9. The method of claim 1, wherein the said mould has a shape such as to obtain a cast product of a desired shape.

10. The method of claim 1, further comprising the step of
    (b') applying a binder to at least one external surface of the said second cast composition obtained at the end of step (c).

11. The method of claim 1, further comprising a step of (d) demoulding the layered composition material after casting and setting of the first and second castable compositions.

12. A layered composite composition obtained according to the method of claim 1.

13. A method according to claim 10, wherein step (a) is repeated after the completion of step (b').

14. A method according to claim 10, wherein steps (a), (b), and (c) are repeated after the completion of step (b').

15. A method according to claim 10, wherein steps (a), (b), (c), (b'), and (a) are repeated after the completion of step (b').

16. The method according to claim 1, wherein the calcium silicate-based cement is a Portland cement.

17. The method according to claim 2, wherein
the inorganic particulate composition comprising quartz is a silica gravel, granite, or basalt;
the silicate or alumina-silicate mineral is a feldspar, andalusite, or a feldspatic sand;
the metallic inserts are I-shaped metallic inserts, U-shaped metallic inserts, metallic wires, or metallic wire mesh; and the polymeric inserts are I-shaped polymeric inserts or U-shaped polymeric inserts.

18. The method according to claim 6, wherein the plastic mould is a polycarbonate mould.

* * * * *